United States Patent [19]

Quintana

[11] 4,084,493

[45] Apr. 18, 1978

[54] APPARATUS FOR PRODUCING FOODSTUFF PRODUCTS

[76] Inventor: Elias Dennis Quintana, 7601 Quebec Dr., Huntington Beach, Calif. 92648

[21] Appl. No.: 772,438

[22] Filed: Feb. 14, 1977

[51] Int. Cl.² ............................................. A21C 9/06
[52] U.S. Cl. .................................. 99/450.7; 99/450.6
[58] Field of Search ................ 99/450.2, 450.3, 450.6, 99/450.7; 53/266 R; 141/158, 168

[56] References Cited

U.S. PATENT DOCUMENTS

| | | | |
|---|---|---|---|
| 3,611,950 | 10/1971 | Battaglia | 99/450.7 |
| 3,669,007 | 6/1972 | Pulici | 99/450.6 |
| 3,757,676 | 9/1973 | Pomora | 99/450.7 |
| 3,782,272 | 1/1974 | Cooper | 99/450.7 |
| 3,912,433 | 10/1975 | Chyen Ma | 99/450.6 |

*Primary Examiner*—Edward J. McCarthy
*Attorney, Agent, or Firm*—Francis X. LoJacono, Sr.

[57] ABSTRACT

An apparatus for producing foodstuff products, wherein a food wrapping comprising a flat flour sheet, known as a "tortilla", is stuffed with a food product of ingredients by dispositing the stuffing ingredients on the tortilla and thereafter folding and rolling the flour sheet to form a foodstuff known as a "burrito". The apparatus comprises a conveyor system arranged to pass the tortilla placed thereon through a series of stations whereby the flour sheet is sequencially wrapped about the foodstuff ingredients to encapsulate the foodstuff therein. The stations include depositing the foodstuff on the flour sheet, folding the side edges of the sheet by a folding chute, folding the leading edge of the sheet back over the food stuffing and folded side edges, rolling the sheet and stuffing back over itself a first time, and again rolling the sheet and stuffing therein a second and final time, after which the stuffed tortilla is discharged from the conveyor as a completed burrito ready for packaging.

17 Claims, 9 Drawing Figures

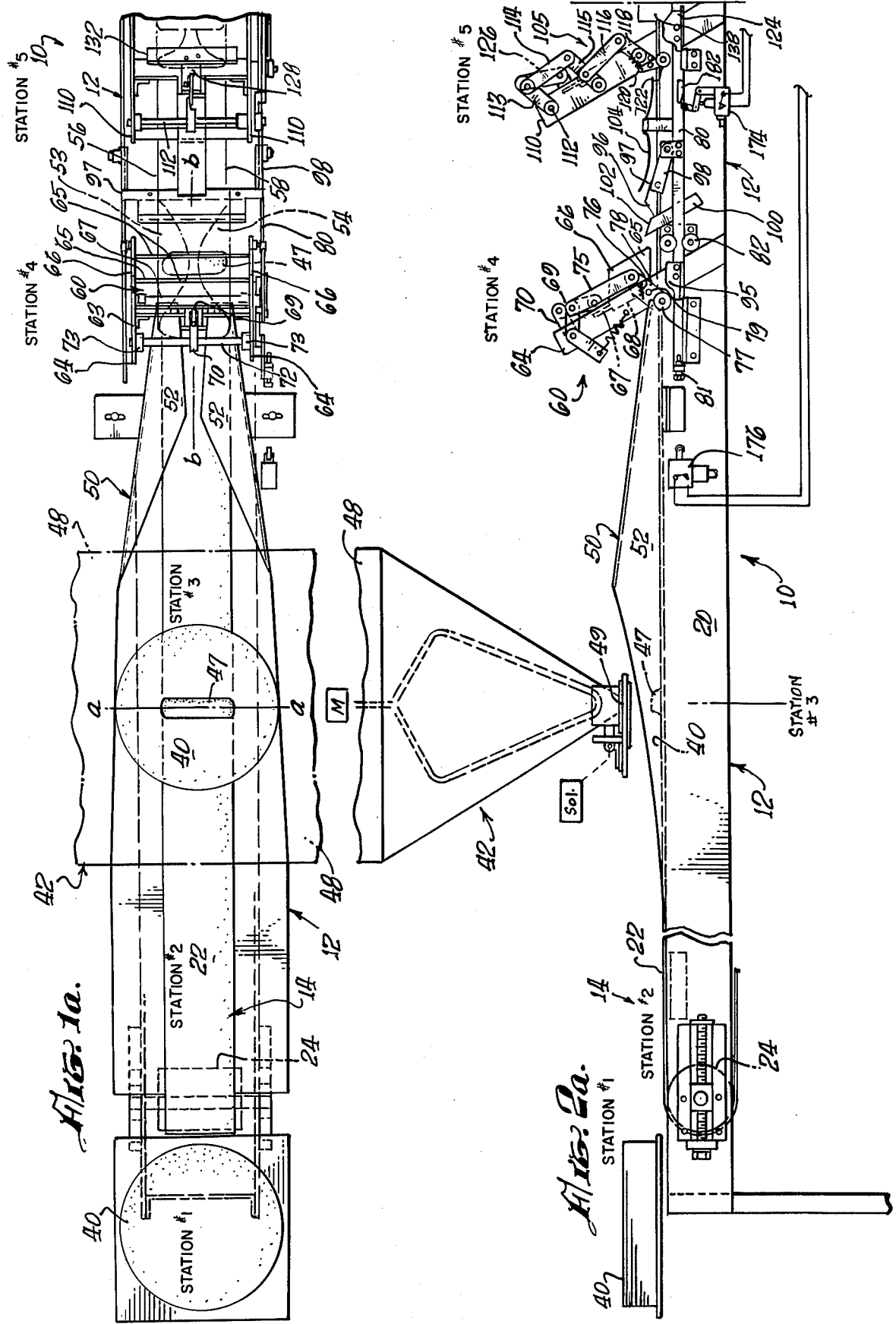

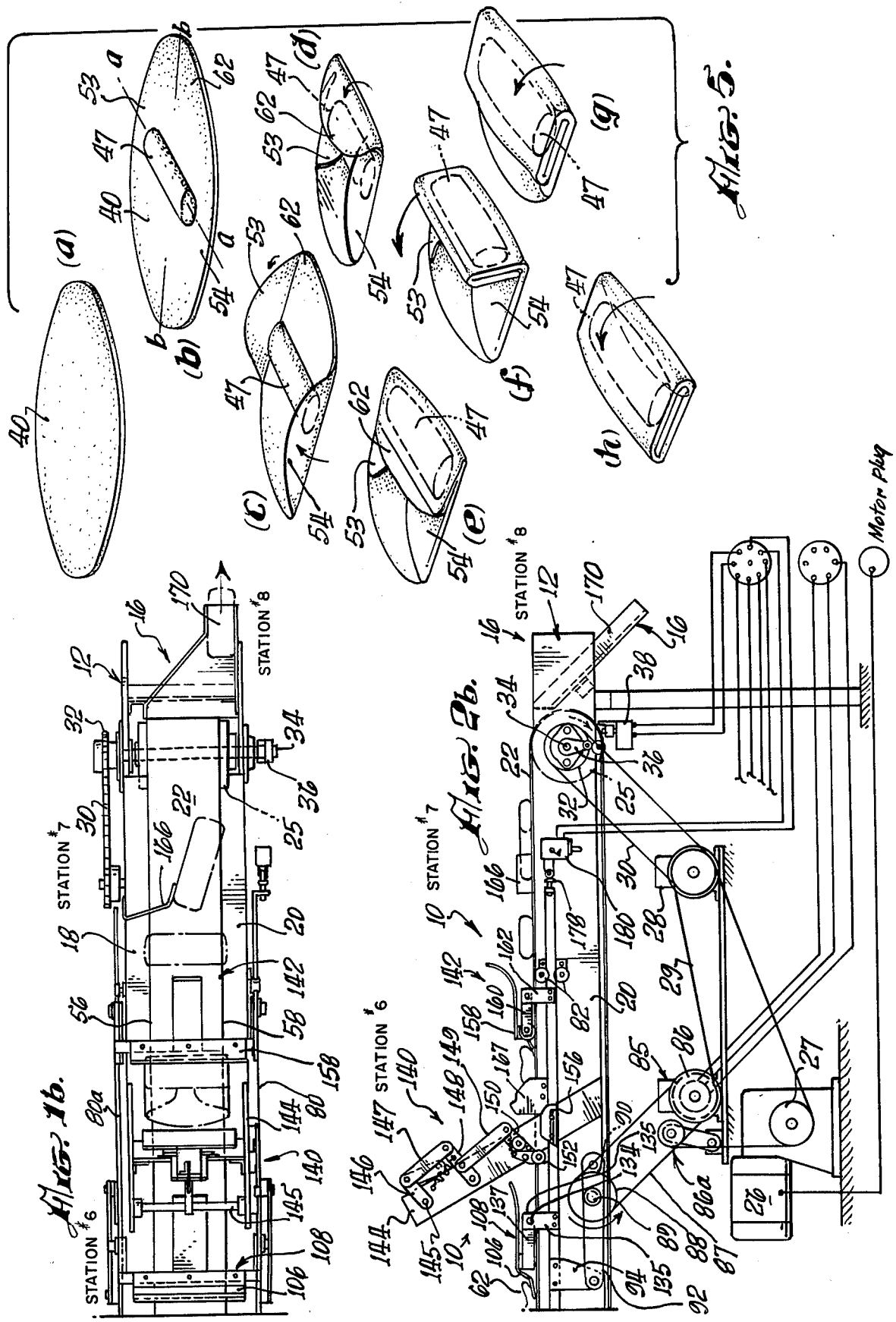

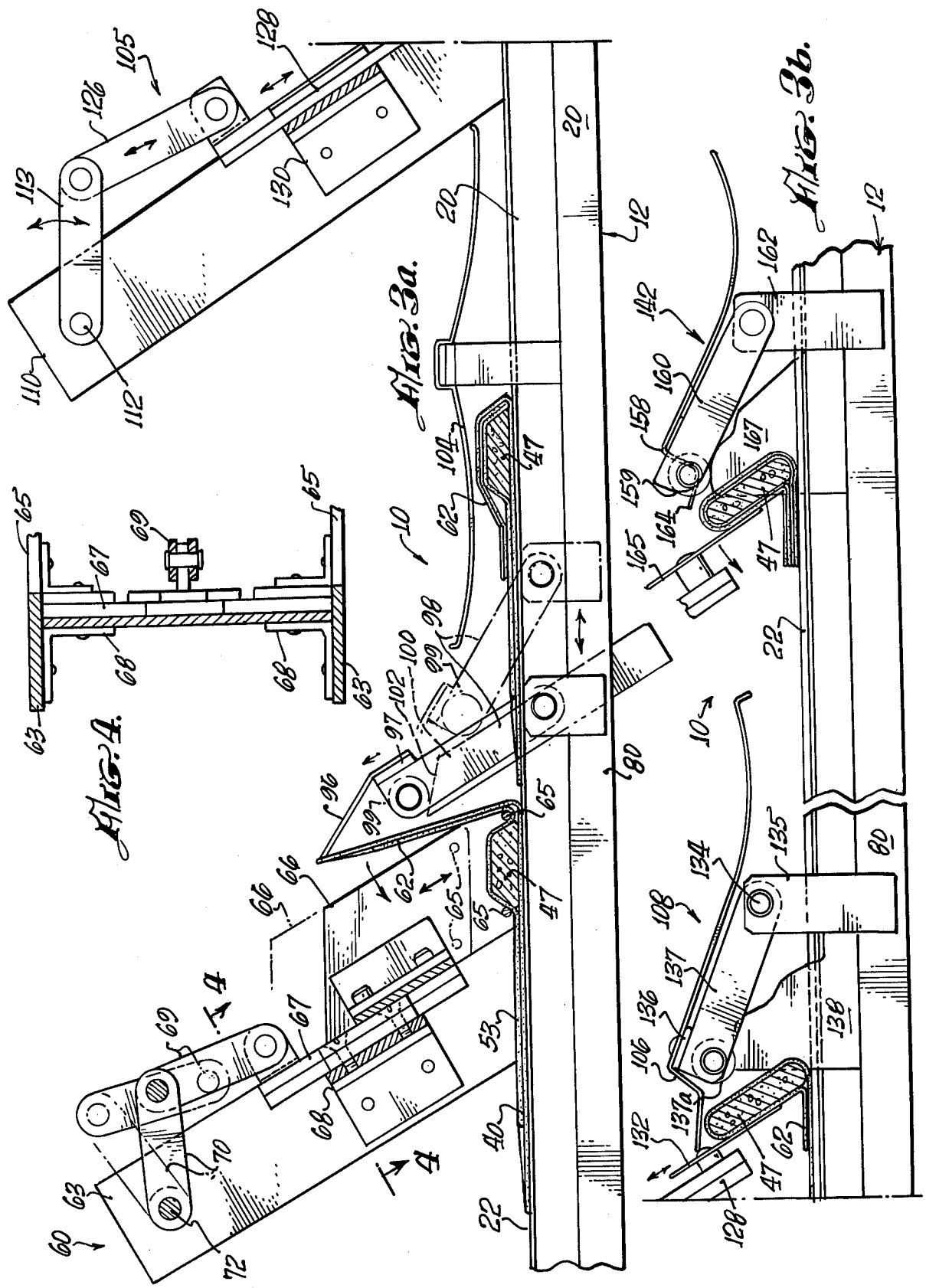

APPARATUS FOR PRODUCING FOODSTUFF PRODUCTS

BACKGROUND OF THE INVENTION

1. Field of the Invention

This invention relates to an apparatus for producing a food product, and more particularly to an apparatus for continuously producing a food product as a "burrito" formed from a flat sheet of flour dough.

2. Description of the Prior Art

As is well known in the art, various problems and difficulties are encountered in providing suitable means for producing certain types of food products in large continuous quantities, particularly rolled foodstuffs whereby the food product must be stuffed, folded and rolled to form the encapsulated end product.

The particular foodstuff which this invention relates to is a food product known as a "burrito", which comprises a flat sheet of wheat dough having a generally circular configuration. This flat sheet is known as a "tortilla" and is conventionally formed into a burrito by manual labor due to the required folding of the sheet of dough, which at the time of folding has a food stuffing placed thereon. The food stuffing is generally provided in a paste like consistency of several varieties of ingredients such as, beans, beans and chili, beef and beans and potatoes, etc., Accordingly, machinery is needed to provide a dependable apparatus which can produce this type of food in quantities to overcome the high cost of present day manually made burrito and will always insure that each formed end item is identical to the preceeding finished item. In addition, other factors present shortages of labor, or the use of labor wherein the individual becomes inattentive, and fatigued and the item produced is inferior as a commercial product.

SUMMARY OF THE INVENTION

The present invention comprises an apparatus for producing a foodstuff product which is known as a "burrito" formed from a thin sheet of flour dough that is used to wrap and encapsulate various food ingredients within the thin sheet of dough called a "tortilla". The tortilla is generally formed as a circular sheet having food ingredients deposited centrally thereon in an elongated manner so as to allow the tortilla to be folded over at several edge portions.

In order to accomplish an end product such as a burrito, the present apparatus comprises a supporting elongated frame structure having a continuous flat conveyor belt system mounted thereto. Sequentially arranged along the length of the frame structure are a plurality of folding and rolling assemblies which directly engage the flour tortilla as it is moved from the forward end to the rearward end of the structure at which time the end product is discharged therefrom.

To simplify the summary of the present invention the following will be related to various stations wherein a particular action or step takes place.

Station #1 represents the beginning of the operation and will be known as the forward or front end of the frame structure and station #8 will represent the rear or back end thereof.

Hence, at station #1 the thin sheet of dough, hereinafter referred to as "tortilla" is stacked in quantities to be individually placed on the continuous belt at station #2. Once the apparatus is started the belt moves forward and stops at station #3, that is the tortilla is positioned directly under the filler hopper and the food ingredients therein is dispensed in a transverse central position on the tortilla. Through various limit switches the conveyor belt is again activated passing the tortilla and food stuff through an edge curling and folding chute just prior to reaching station #4. As the tortilla passes through the chute the side edge thereof are curled and folded over the food stuff forming right and left hand folds thereby defining the length of the burrito to be formed.

Following this, the forward or leading edge of the tortilla engages a folding pad, the belt stops and pressing bars engage the tortilla transversely of the folded sides, pressing the sides against the food ingredients. At the same time, the folding pad lifts the forward leading edge of the dough sheet and the pressing bars are retracted. The belt again moves forward, the leading edge is bent forward over the ingredients and side edges as they move rearwardly under a pressing pad to station #5.

Reaching station #5, the belt again stops allowing a back-up plate to engage the tortilla forward of the ingredients at which time the ingredients therein is lifted and rolled over by a roll-over pad whereby the food product is positioned on top of tortilla at least two-thirds of the way.

After station #5, the product is moved to station #6 for the last fold and roll step which is similar to the operation of station #5. However, the food ingredients at this point is rolled and folded over the rear end or trailing edge of the flour tortilla to thus form a completed burrito.

Following this completed operation the burrito engages a turning arm as it travels rearwardly with the belt and is turned so that the length thereof is in parallel relation with the travel of the conveyor belt so that it can be discharged into a packaging drop chute which represents station #8.

Various synchronizing means are included therein so as to provide the necessary regulated operations of the conveyor belt with the actuation of each folding and rolling assemblies, wherein the synchronizing means comprises a plurality of cam and cam followers together with various cam operated electrical switches and a pair of clutch-brake assemblies driven by a continuously operated motor.

OBJECTS AND ADVANTAGES OF THE INVENTION

The present invention has for an important object a provision wherein foodstuff ingredients can be encapsulated within a thin sheet of flour dough without the use of manual labor and in a continuous manner whereby each end product produced is identical to each other having the same quantity of ingredients disposed therein and a common overall configuration.

It is another object of the invention to provide an apparatus for producing foodstuff products, wherein the food wrapping is a thin circular flour dough sheet that is capable of being folded and rolled about various food ingredients.

It is still another object of the invention to provide an apparatus for producing foodstuff products wherein the resulting food product is a "burrito" made from a thin sheet of dough known as a "tortilla".

It is a further object of the invention to provide an apparatus of this character that is easy to service and maintain and can be operated by one individual.

It is a still further object of the present invention to provide an apparatus for producing a burrito wherein the apparatus is somewhat simple and rugged in construction having novel and unique means to automatically fold and roll the flour tortilla into a form of a burrito.

Still another object of the invention is to provide an apparatus of this character that allows a food product of this type to be manufactured in a very economical manner, thereby eliminating costly manual labor as is presently used.

The characteristics and advantages of the invention are further sufficiently referred to in connection with the accompanying drawings, which represent one embodiment. After considering this example, skilled persons will understand that variations may be made without departing from the principles disclosed and I contemplate the employment of any structures, arrangements or modes of operation that are properly within the scope of the appended claims.

BRIEF DESCRIPTION OF THE DRAWINGS

Referring to the drawings, which are for illustrative purposes only:

FIGS. 1a and 1b are continuous top views of the present invention;

FIGS. 2a and 2b are continuous side elevational views thereof;

FIGS. 3a and 3b are enlarged cross-sectional views showing the various stations during the processing of the foodstuff being encapsulated within the thin flour dough sheet;

FIG. 4 is a cross-sectional view taken substantially along line 4—4 of FIG. 3a;

FIG. 5 is a pictoral representation illustrating the forming process of the burrito.

DESCRIPTION OF THE PREFERRED EMBODIMENT

Figure 6:
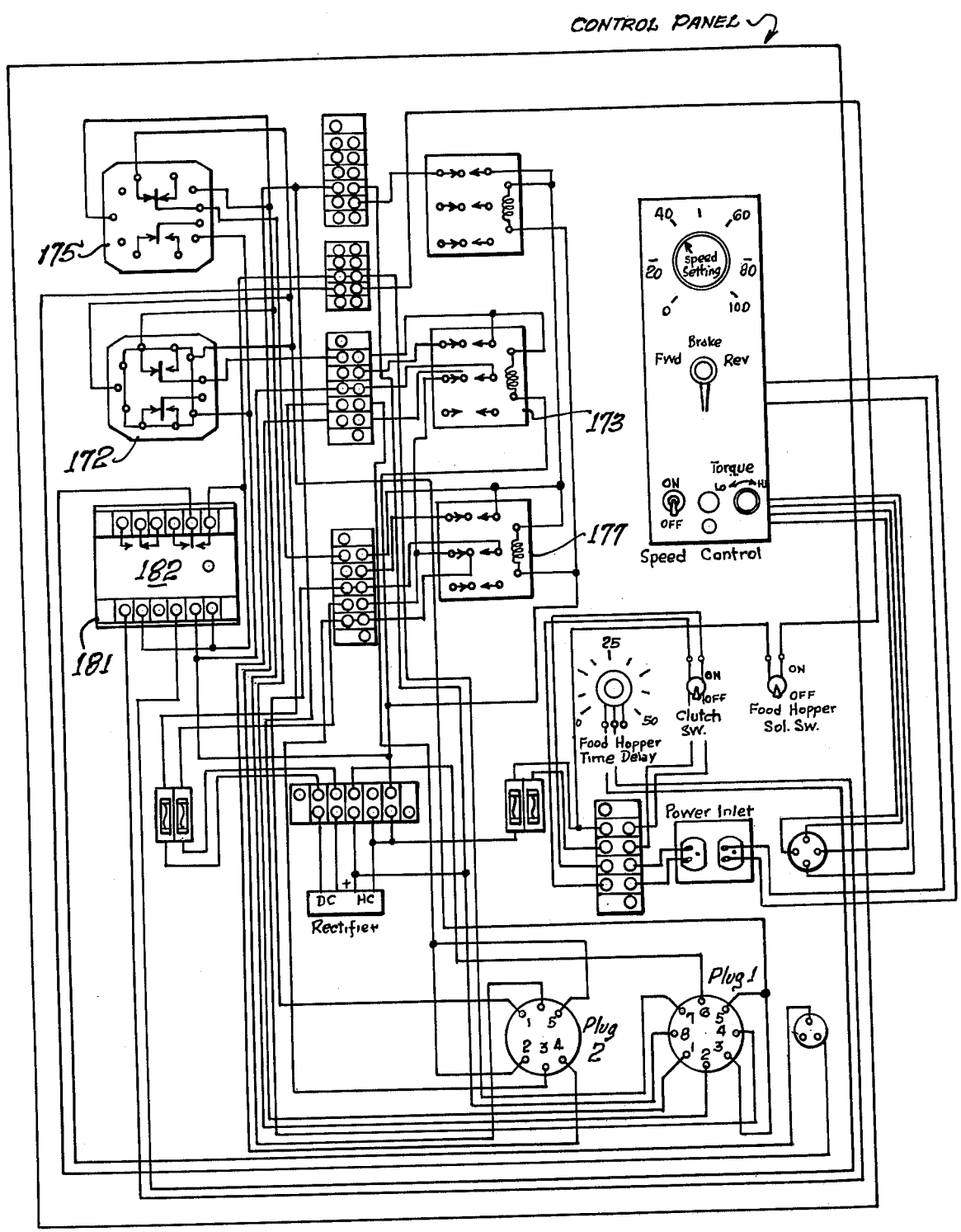
FIG. 6 is a wiring circuit of the control panel which operates the present apparatus.

Referring more particularly to the accompanying drawings, there is shown an apparatus for producing a foodstuff product, indicated generally at 10, the foodstuff product, will be hereinafter referred to as a "burrito", the burrito being a Mexican type food made from a very thin, flat, circular sheet of flour dough, hereinafter referred to as a "tortilla". The tortilla is used as a wrapping to encapsulate various foodstuffs of a generally pasty filler material. There are several common ingredients which are used as filler material, some of these being refried beans, ground meat mixtures, beans and chili, beef and beans, beef and potatoes, etc.

Commonly, the burrito is made by hand and is a very time consuming process of first filling, then folding the tortilla about the filler material and rolling to totally enclose the filler material therein. Once this is accomplished the burrito is formed and can then be warmed as is just prior to eating.

The apparatus 10 comprises a support frame structure, generally indicated at 12 having a forward or front end 14, a rear or discharge end 16 and left and right side members 18 and 20 respectively. Hence, there is defined an elongated structure to which a conveyor system is operably mounted thereto, wherein the conveyor system includes various well known elements, these being a continuous flat belt 22 which moves from the forward end rearwardly. The belt is supported by conventional belt drums 24 and 25, whereby drum 24 is adjustable mounted at the forward end 14, so as to provide the necessary tension to said belt 22.

Included within the conveyor system is a drive means which comprises a gear reduction motor 26 that is arranged to be constantly driven during the overall operation of the apparatus. A sprocket gear 27 is attached to said motor 26 and is inter-connected to a conveyor clutch-brake assembly 28 by a sprocketed drive chain 29. From the clutch-brake assembly 28 a second chain drive 30 is operably attached to a sprocket gear 32 of the rear drum 25, thereby imparting the sequential movement of the belt 22. The shaft 34 of the rear drum 25 extends outwardly and is provided with a cam arm 36, the cam being positioned to engage limit switch 38 which controls the operation of the belt 22. A more detailed description thereof will follow hereinafter.

The flour tortillas 40 are first positioned at a point adjacent the forward end 14 of the belt 22, which will be hereinafter referred to as Station #1 of the operation of the apparatus. Each tortilla 40 is individually placed on the conveyor belt 22, representing Station #2, this can be accomplished by any suitable device including a manual operation. Once the flat tortilla is arranged on the belt 22 the apparatus is put into operation wherein thereafter each tortilla is sequencially deposited on the belt.

Accordingly, as the belt 22 moves rearwardly it passes under a foodstuff despensing means, generally indicated at 42, said despensing means can be any suitable despensing device and is herein shown as a hopper 48 removably mounted above the conveyor belt 22, having an electrically operated sliding door 49 which is timely sequenced to open and allow the ingredients 47 therein to be deposited on the tortilla in a longitudinal transverse manner to that of the travel of the belt 22. This operation takes place at Station #3. It should be understood at the time the foodstuff is dispensed from the hopper 48 the belt is not moving due to the various timing switches and cam means.

Further, it is contemplated that various additional food hoppers can be interchanged with other hoppers having different food ingredients therein for depositing on the flour tortilla.

Thus, the foodstuff is placed on an imaginary transverse centerline a—a of the tortilla 40 as seen in FIG. 1a.

After the foodstuff is so arranged thereon, the belt moves the tortilla together with foodstuff 47 to Station #4, however as it moves rearwardly the tortilla passes through a folding chute, generally indicated at 50, having oppositely disposed curling side walls 52 as seen in FIGS. 1a and 2a. The edges 53 and 54 of the tortilla adjacent the respective longitudinal edges 56 and 58 of the belt 22 are automatically curled and folded over to a point where each edges 53 and 54 meet along the longitudinal center line b—b of the tortilla, indicated in FIGS. 1a and 5, thereby covering the foodstuff disposed therein and establishing the length of the product being made. From this point the product is positioned at Station #4 and the belt is sequentially stopped, at which time the folding means, indicated generally at 60, begins its operation by folding the leading edge 62 of the tortilla, as seen in FIGS. 5d and 5e. In order to do this, the first folding means comprises a pair of oppositely disposed bracket arms 63 and 64 mounted to the respective left and right hand side members 18 and 20 of the frame structure 12. The bracket arms are tilted forwardly at an angle seen in FIGS. 2a and 3a. Slidably mounted to bracket arms 63 and 64 is a pressing means comprised of a pair of transversely arranged press bars 65 attached to pressing bar brackets 66 which in turn affixed to a sliding plate 67. The sliding plate is received in slide bracket 68 positioned between and attached to said bracket arms 63 and 64. The press bars are allowed to slide up and down at the angle set by bracket arms 63 and 64. To accomplish the sliding movement of the press bars 65, a linkage system is attached to the sliding plate 67 at one end thereof. The linkage system comprises a plurality of link members, wherein link members 69 and 70 connects slide plate 67 to the transverse shaft 72 operably mounted between each bracket arm 63 and 64, the shaft being journaled in bearings 73 affixed to the upper end of each bracket 63 and 64. Additional linkage is provided at the extended end of the shaft, that being links 74 and 75 which attach to an actuator lever 76. Actuator lever 76 is pivotally mounted to bracket 64 and includes a cam follower 77 pivotally attached thereto, the cam follower 77 being biased by spring 78 against a stop pin 79. Links 74 and 75, actuator bar 64 and the cam follower 77 are all positioned adjacent the right hand side member 20 so as to be operably engageable with the overall cam means, the cam means controlling all Stations.

Before further description of the remaining Stations, it would be well to understand the arrangement of the cam means, which comprises an elongated cam supporting bar 80 which is located along right side member 20. The bar 80 is mounted to member 20 by cam bar guide rollers 82, thereby allowing said bar 80 to reciprocate forwardly and rearwardly to activate the various folding and rolling operations. Thus, the bar 80 is indirectly operably connected to the gear reduction motor 26. That is, as the sequential timing steps take place, the motor drives chain 29, the chain in turn drives a second clutch-brake assembly 85 through sprocket 86, wherein an idler sprocket 86a is included in the well established manner.

There is also provided a sprocket chain 87 which is connectd between cam bar clutch-brake assembly 85 and a cam actuating means comprised of sprocket 88 mounted to shaft 89 which also has crank arm 90 secured thereto. A connecting rod 92 is attached between crank arm 90 and a cam bar bracket 94 as seen in FIG. 2b. Thus, it can be seen that when the operation of the clutch-brake assembly 85 is activated the elements of the cam bar 80 are reciprocated, thereby causing various cams attached thereto to move therewith.

Referring again to cam follower 77 of the first fold means 60, there is included a cam pressing plate actuator 95 attached to cam bar 80 so as to engage cam follower 77 when the bar 80 is moved forward. Cam plate actuator 95 engages cam follower 77 forcing movement of the links that in turn operates the press bars 65 as previously described. As the cam bar 80 returns rearwardly the cam follower returns to its normal position against stop pin 79 because of its biasing spring 78. During the operation of the press bars 65 the leading edge 62 of the tortilla is superposed over folding pad 96 and is simultaneously raised upwardly as seen in FIG. 3a.

The folding pad 96 is secured to a transverse mounting strut 97 that connects between a pair of folding pad legs 98, the legs include rollers 99 for engagement with angularly positioned ramp rib members 100. The upper ends of the rib member have a small flat head 102 that allows the pad 96 to raise and lower without interfering with the press bars 65 as they slide up and down. FIG. 3a illustrates the sequential positions of the folding pad 96 returns to a horizontal positon and stops, belt 22 again moves forward with the leading edge 62 bent upwardly to engage pressing plate 104 which presses edge 62 over foodstuffing 47 and the previously folded edges 53 and 54.

The conveyor belt further transports the tortilla 50 and foodstuff 47 therein to Station #5, which comprises a second folding means 105 and stops with the tortilla being received on a lift and roll arm pad 106 which is part of the lift and roll means indicated generally at 108. Said second folding means 105 includes mounting side brackets 110 secured to each side members 18 and 20 as previously described for folding means 60. A shaft 112 is journaled between brackets 110 and is operated through connecting links 113, 114, 115, 116 and crank arm 118 pivotally attached to bracket 110. These elements are actuated through cam follower lever 120 and cam roller 122, the cam roller 122 being positioned to engage a cam plate 124 also secured to reciprocating cam bar 80. Thus, as cam bar slides forward cam plate 124 engages cam roller 122 causing the associated link to actuate thereby rotating shaft 112 causing the associated link to actuate thereby rotating shaft 112 which in turn actuates link arm 126. Link arm 126 is connected to a sliding plate 128 slidably mounted in slide brackets 130, the slide brackets 130 being attached to each main side mounting brackets 110. Supported by the sliding plate 128 is a back-up plate 132, which when actuated engages the folded leading edge 62 just behind the foodstuff ingredients as seen in FIG. 3b. As the lower edge of back-up plate 132 contacts the tortilla, said lift and roll pad 106 moves upwardly about pivot 134 of vertical member 135 which is secured to cam bar 80. It also should be noted that a second longitudinal bar 80a is slidable arranged adjacent left side member 18 of frame structure 12. Bar 80a stabilizes the movements of the related members secured thereto.

The lift and roll pad 106 is attached to a transverse member 136 which is secured to side legs 137, the side legs being pivotally attached to vertical member 135. Therefore, the pad lifts the foodstuff upwardly rolling it over against back-up plate 132 as seen in FIG. 3b. The front end of said pad 106 is caused to lift upwardly when cam roller 137a affixed to each side leg member 137 engages oppositely disposed ramp plates 138. When bar 80 and 80a are retracted rearwardly back-up plate 132 moves from behind the foodstuff portion of the tortilla allowing it to roll over edge 62 of the tortilla.

The conveyor belt starts moving again bringing the rolled tortilla to Station #6 where the product is completed and formed as a burrito. Station #6 comprises a third folding means 140 which includes a second lift and roll means 142 which is identical to that of Station #5. It too has side main support brackets 144, a shaft 145 and a plurality of links 146, 147, 148, 149 and 150 all interconnected with a cam lever 152 having a cam follower in the form of a roller 154 which rides against cam plate 156 attached to said cam bar 80. Additionally there is also included a lift and roll pad 158 having a forward roller 159 secured to side leg member 160 which are pivotally mounted to vertical mount members 162.

Pad 158 includes a transverse flange 164 that receives the tortilla thereon and lifts it against a backup slide plate 165 which operates in the same manner as previously described for Station #5, whereby forward roller 159 rides up the cammed edge of plate 167.

After the last roll-over is made the burrito is formed and is transported rearwardly to Station #7 where it engages a means to turn the burrito lengthwise parallel to the movement of the conveyor belt 22. Said turning means comprises a laterally extended stationary partition 166 or arm that contacts one end of the burrito as it moves to the discharge end whereby the burrito is caused to rotate longitudinally in the direction of travel with belt 22.

The burrito then discharges at Station #8 by means of a discharge chute 170 as seen in FIG. 1b.

SEQUENCE OF OPERATIONS

From Station #1 (tortilla supply stack), a tortilla 40 individually positioned on conveyor belt 22 at Station #2. Each tortilla 40 should be located approximately on center of the conveyor belt. With cam-bar assembly 80 located in the backward most position having cam arm 36 secured to the conveyor belt drive shaft 34 and disposed in a vertical depending position, limit switch 38 is tripped to a closed mode. Through time-delay-timer 172, power will be applied to relay 173, which in turn will energize clutch-brake 85 at which time the clutch is engaged and the brake thereof is released through timer 175, power will be turned "OFF" to relay 177 whic in turn energizes clutch-brake 28, (clutch releases, brake engages). Clutch-brake 85 will drive cam-bar assembly 80 through connecting rod 92 and crank 90, moving the cam-bar to its forward most position. At the end of the stroke, the plunger 81 mounted to the forward end of the cam-bar assembly will trip limit switch 176 through timer 175 and relay 177 thereby energizing clutch-brake 28 (clutch engaged, brake released) and driving conveyor belt 22 transporting the tortilla rearwardly. As the conveyor belt drum 25 rotates one full revolution, cam 36 will trip limit switch 38 through timer 172 and relay 173 energizing clutch-brake 85, thereby actuating cam-bar assembly 80 to the rearward most position. At the end of the rearward stroke, a second plunger 178 mounted to the rear end of cam-bar 80 trips limit switch 180, again energizing clutch-brake 28 through timer 175 causing conveyor belt 22 to rotate and move the tortilla to Station #3, which is directly under the food hopper 48. Cam 36 on drive shaft 34, having made one revolution, trips limit switch 38, energizing clutch-brake 85 (clutch engaged, brake released) driving cam-bar assembly in the forward direction causing switch cam 182 to trip limit switch 174 through time-delay-timer 181. The solenoid will open slide door 69 at the bottom of hopper 48, allowing food to be dispensed on to the floor tortilla. Time-delay-timer 182 will break switch contact within 0.05 seconds to 0.05 seconds depending on the amount of food to be deposited thereon. Cam-bar 80 again engages switch 174 energizing clutch-brake 28 wherein the belt 22 moves rearwardly, each movement of said belt is approximately 16 inches.

It should be noted that when the first tortilla reaches Station #3, another tortilla will be set on the conveyor belt at Station #2. Thus, this operation will continue throughout the sequence of operation.

Accordingly, each operation performed along the belt-way is caused by the 360° rotation of cam 36 which sequencially causes the various movements of the belt, hopper and cam-bias assembly.

After leaving Station #3 the tortilla and the food product disposed thereon passes through the curling and folding chute 50, thereby folding and curling two side edges 53 and 54 of the tortilla 40 these edges being perpendicular to the conveyor belt, wherein the edges 53 and 54 are folded inwardly to the longitudinal center line of the tortilla. As conveyor belt 22 moves tortilla 40 to Station #4, the front end 62 of said tortilla will slide up and over the folding pad 96, which is connected, as previously described, to cam-bar 80. The food product and the tortilla is positioned centrally underneath the press-slide assembly 60 when the belt 22 comes to a stop. The press-slide is actuated by cam 95, pivoting cam follower lever 77 and related links causing press bars 65 to move downward and engage the tortilla and press the folded sides to the food width of the stuffed tortilla.

Thus, as cam-bar 80 moves forwardly, the folding pad 96 moves up ramp plate 100 lifting front end 62 of tortilla 40 up and folding it over the food product. Actuating cam 95 will then disengage cam-follower lever 77 allowing slide to move to the up-position. When plunger 81 again trips switch 176, the belt moves rearwardly positioning the food product at Station #5.

The tortilla will slide up the lift and roll pad 106 and be held there until the conveyor belt stops and cam-bar activates the proper components in a normal sequencial manner at which time the lift and roll pad 106 will move the tortilla and food product in a forwardly direction. The slide-backup plate assembly moves downwardly to engage the tortilla just behind the food product and holds it in position as the lift and roll pad 106 moves up on the ramp plate, lifting the tortilla together with the food product up against the back-up plate side as seen in FIG. 3b. The actuating cam 124 will then disengage the cam-follower 122, allowing back-up plate 132 to move to the "up" position, releasing tortilla and food product to be rolled over by the lift and roll-over pad 106. The cam-bar assembly continues moving forwardly until plunger 81 again trips limit switch 176 and energizing clutch-brake 28, whereby the belt 22 is moved rearwardly taking the folded tortilla to Station #6.

The operation that takes place at Station #6 is identical to the operation at Station #5 with the exception that this is the final folding sequence with the end result of forming a completed burrito.

After the burrito is completed it is then moved by the belt to the discharge end 16. However, during the travel from Station #6 the burrito is turned by turning arm 166 so that the burrito will be positioned parallel to the travel of the conveyor belt 22, whereby it will be in position to slide down the discharge chute 170.

Each of the operations that have been herein described will be repeated at the rate of one operation every 6 seconds at its minimum speed, to approximately one operation every 2 seconds at its maximum speed.

The invention and its attendant advantages will be understood from the foregoing description and it will be apparent that various changes may be made in the form, construction and arrangement of the parts of the invention without departing from the spirit and scope thereof or sacrificing its material advantages, the arrangement herein before described being merely by way of example, and I do not wish to be restricted to the specific form shown or uses mentioned, except as defined in the accompanying claims.

I claim:

1. An apparatus for producing a foodstuff product wherein a food-filler material is encapsulated within a thin sheet of dough, said apparatus comprising:
   a supporting frame structure;
   a conveyer system sequentially activated for transporting said sheet of dough thereon;
   drive means connected to said conveyor system for sequentially moving said conveyor system longitudinally along said frame structure;
   a foodstuff-dispensing means arranged to deposit a predetermined quantity of said filler onto said sheet of dough in a transverse manner to that of the travel of the conveyor system, said means being removably attached to said frame structure thereof;
   a folding chute having oppositely disposed curling side walls whereby the longitudinal edges of said sheet of dough are folded inwardly thereby, said chute being positioned rearwardly of said dispensing means;
   a first folding means positioned following said folding chute whereby the leading edge of said dough is folded over said filler and longitudinal edges thereof, and including a pressing means formed therewith to press down said longitudinal edges of said sheet of dough during the folding of said leading edge thereof;
   a second folding means positioned rearwardly of said first folding means whereby said sheet of dough, along with said filler, is folded over said previously folded leading edge thereof;
   a third folding means positioned rearwardly of said second folding means whereby the filler material is further folded over the trailing edge of said sheet of dough, wherein said foodstuff produce is completely formed thereby; and
   a sequential actuating means interconnecting said folding means and said conveyor system to said drive means.

2. An apparatus as recited in claim 1, wherein said conveyor system comprises a continuous longitudinal conveyor belt having a forward adjustable idler drum and a rearward drive drum, and wherein said apparatus includes a discharge means arranged at the rear of said conveyor belt.

3. An apparatus as recited in claim 2, wherein said first folding means inludes a folding pad and a pressing plate interposed between said first folding means and said second folding means.

4. An apparatus as recited in claim 3, wherein said second folding means includes a first lift-and-roll means for engagement with said dough and filler material.

5. An apparatus as recited in claim 4, wherein said third folding means includes a second lift-and-roll means.

6. An apparatus as recited in claim 5, wherein said drive means comprises:
   a continuously operating motor means; and
   brake-and-clutch means sequentially operated and operably connected to said motor means and said sequential-actuating means.

7. An apparatus as recited in claim 6, wherein said actuating means comprises:
   cam-actuating means; and
   crank means interconnecting said cam-actuating and said drive means whereby said cam-actuating means is arranged to be longitudinally moved in a reciprocating manner to engage each of said folding means.

8. An apparatus as recited in claim 7, wherein said actuating means includes a plurality of limit-switch means to sequentially control the movement of said conveyor system, said actuating means and said brake-and-cluch means when said cam-actuating means engages said limit-switch means.

9. An apparatus as recited in claim 8, wherein said first folding means includes a plurality of linkage means having a cam follower mounted thereto for engagement with said cam-actuating means.

10. An apparatus as recited in claim 9, wherein said second folding means includes a plurality of linkage means having a cam follower mounted thereto for engagement with said cam-actuating means and a back-up plate for engagement with said sheet of dough when said dough and filler are being folded thereby.

11. An apparatus as recited in claim 10, wherein said third folding means includes a plurality of linkage means having a cam follower mounted thereto for engagement with said cam-actuating means, and a back-up plate for engagement with said sheet of dough when said dough and filler are being folded thereby.

12. An apparatus as recited in claim 11, wherein said cam-actuating means includes:
   at least one horizontal longitudinally disposed cam bar slidably mounted to said supporting frame structure; and
   a plurality of plates arranged to engage respective cam followers of each of said folding means and respective limit-switch means.

13. An apparatus as recited in claim 12, wherein said cam-actuating means also includes:
   means for actuating said folding pad of said first folding means; and
   means for actuating said first and second lift-and-roll means.

14. An apparatus as recited in claim 13, wherein said limit-switch means includes:
   a first limit switch arranged to sequentially operate said foodstuff-dispensing means;
   a second limit switch arranged to sequentially control the forward and rearward movements of said cam bar; and
   a third limit switch arranged to sequentially operate the movement of said conveyor belt;
   and wherein there is included an operating electrical-power circuit interconnecting each of said switches, whereby said brake-and-clutch means are operated under sequential control.

15. An apparatus as recited in claim 14, wherein a pair of brake-and-clutch means is provided, one of said brake-and-clutch means being operably connected between said motor means and said drive drum of said conveyor system, said other brake-and-clutch means being operably connected between said motor means and said cam-actuating means, whereby said conveyor belt operates when said cam-actuator means is inoperative and said cam-actuator means operates when said conveyor belt is inoperative.

16. An apparatus as recited in claim 8, wherein said pressing means of said first folding means comprises a pair of pressing-bar members transversely arranged to be positioned on both sides of said filler material, pressing said longitudinal edges in position over the lateral ends of said filler material whereby the longitudinal folded edges establish the length of the foodstuff product.

17. An apparatus as recited in claim 2, wherein said discharge means comprises:
   a turning arm transversely positioned across at least half the width of said conveyor belt for imparting a turning engagement with said foodstuff product so as to align said product in longitudinal relationship with the travel of said conveyor belt; and
   a discharge chute located at the terminating end of said support frame structure.

* * * * *